(12) United States Patent
de Campos Ruiz et al.

(10) Patent No.: US 9,304,836 B2
(45) Date of Patent: Apr. 5, 2016

(54) BRIDGING DATA DISTRIBUTION SERVICES DOMAINS BASED ON DISCOVERY DATA

(75) Inventors: Alejandro de Campos Ruiz, Mountain View, CA (US); Gerardo Pardo-Castellote, Palo Alto, CA (US); José María López Vega, Granada (ES); Fernando Crespo Sanchez, Mountain View, CA (US)

(73) Assignee: Real-Time Innovations, Inc., Sunnyvale, CA (US)

(*) Notice: Subject to any disclaimer, the term of this patent is extended or adjusted under 35 U.S.C. 154(b) by 876 days.

(21) Appl. No.: 13/134,041

(22) Filed: May 26, 2011

(65) Prior Publication Data
US 2011/0295923 A1    Dec. 1, 2011

Related U.S. Application Data

(60) Provisional application No. 61/396,547, filed on May 28, 2010.

(51) Int. Cl.
*G06F 15/16* (2006.01)
*G06F 17/30* (2006.01)
*G06F 9/54* (2006.01)

(52) U.S. Cl.
CPC ..................... *G06F 9/542* (2013.01)

(58) Field of Classification Search
CPC .................. H04L 29/08135; H04L 29/08144; H04L 29/0809; G06F 17/30864; G06F 17/30595
USPC ..................... 709/201; 707/10, 711
See application file for complete search history.

(56) References Cited

U.S. PATENT DOCUMENTS

| | | | |
|---|---|---|---|
| 7,533,128 B1 | 5/2009 | Sanchez | |
| 7,665,096 B2 | 2/2010 | Weida | |
| 2007/0179959 A1 | 8/2007 | Sharma et al. | |
| 2008/0270413 A1* | 10/2008 | Gavrilov et al. | 707/10 |

* cited by examiner

*Primary Examiner* — Phuoc Nguyen
*Assistant Examiner* — Kishin G Belani
(74) *Attorney, Agent, or Firm* — Lumen Patent Firm

(57) ABSTRACT

Bridging data distributed service (DDS) domains in a networked system based on discovery data is provided. Each DDS domain includes DDS software applications capable of publishing data and subscribing to data. A DDS domain bridge is communicatively coupled with the DDS software applications of both DDS domains. The DDS domain bridge monitors discovery data provided by the DDS software applications for a topic name, a topic type, and/or QoS properties. The DDS domain bridge includes creation rules and enabling rules controlling input/output DDS dataflow objects. Based on the state of the DDS dataflow objects set by the rules, uni- or bi-directional DDS dataflow is established between the input and output DDS dataflow objects enabling data propagation between DDS software applications of DDS domains.

7 Claims, 5 Drawing Sheets

BRIDGING DATA DISTRIBUTION SERVICES DOMAINS BASED ON DISCOVERY DATA

CROSS-REFERENCE TO RELATED APPLICATIONS

This application claims priority from U.S. Provisional Patent Application 61/396,547 filed May 28, 2010, which is incorporated herein by reference.

FIELD OF THE INVENTION

The invention relates to Data Distribution Service (DDS). In particular, the invention relates to bridging DDS domains based on discovery data.

BACKGROUND OF THE INVENTION

Data Distribution Service (DDS) for Real-time Systems is a specification of a publish/subscribe middleware for distributed systems created in response to the need to standardize a data-centric publish-subscribe programming model for distributed systems. As a networking middleware DDS simplifies complex network programming. It implements a publish/subscribe model for sending and receiving data, events, and commands among the nodes. Nodes that are producing information (publishers) create "topics" (e.g., temperature, location, pressure) and publish "samples." DDS takes care of delivering the sample to all subscribers that declare an interest in that topic. DDS handles all the transfer chores: message addressing, data marshalling and demarshalling (so subscribers can be on different platforms than the publisher), delivery, flow control, retries, etc. Any node can be a publisher, subscriber, or both simultaneously.

In DDS, a DDS domain represents a communication plane in which only Publishers and Subscribers attached to the same domain may interact. A controlled exchange of information between different DDS domains would be desired as it would increase system scalability and would be able to support use cases such as the enforcement of security policies or integration with legacy systems with different topic types. The present invention addresses the problem of automatic exchange of information between DDS domains.

SUMMARY OF THE INVENTION

The present invention provides a method for bridging data distributed service (DDS) domains. In one example, the invention is embodied in a networked system having a first DDS domain and a second DDS domain. Each DDS domain includes a plurality of DDS software applications, whereby each DDS software application is capable of running on a computer platform in an independent and distributed manner across the networked system. Furthermore, each of the DDS software applications publishes data and subscribes to data.

A DDS domain bridge, executable as a software application or a software library on a computer system, is communicatively coupled with the DDS software applications of both DDS domains. The DDS domain bridge monitors discovery data provided by the DDS software applications for a topic name, a topic type, QoS properties or any combination thereof.

The DDS domain bridge includes a plurality of bridge domain rules based on said topic name, topic type, QoS properties or any combination thereof. These rules are organized as creation rules and enabling rules. The creation rules control the creation of input DDS dataflow objects and output DDS dataflow objects. The enabling rules control the enabling state of the input and output DDS dataflow objects.

When both the input and output DDS dataflow objects are set in an enabling state, a DDS dataflow is established between the input DDS dataflow objects and the output DDS dataflow objects. The DDS dataflow enables data propagation from one or more of the DDS software applications in the first DDS domain (i.e through the enabled input DDS dataflow objects subscribing to the published data) to one or more of the DDS software applications in the second DDS domain (i.e. through the enabled output DDS dataflow objects publishing the received data).

The DDS domain bridge can be configured uni-directional or bi-directional. In a special case of a uni-directional configuration the DDS domain bridge can be configured to prevent showing, publishing or writing classified data.

In addition to data propagation, the DDS dataflow can further include steps of normalizing, transforming or removing some or all of the data.

In general, data propagation and in one example also including normalizing, transforming and/or removing is concerned with propagation of data properties (e.g. related to, but not limited to, a source timestamp, an identity, a deadline, a latency budget, an ownership strength, a lifespan, or a combination thereof), data values (e.g. related to data types) or a combination thereof.

The method could further include the creation of a redundant DDS Domain bridge configuration. This redundant configuration includes a first DDS domain bridge, which is similar to the one described supra and a second DDS domain bridge configured similarly as the first DDS domain bridge.

DETAILED DESCRIPTION

A data distributed service (DDS) domain according to the present invention establishes a virtual network that links all the software applications able to communicate with each other. It represents a communication plane where only the publishers and the subscribers attached to the same domain may interact. In this way, several independent distributed software applications can coexist in the same physical network without interfering, or even being aware of each other.

Figure 1:
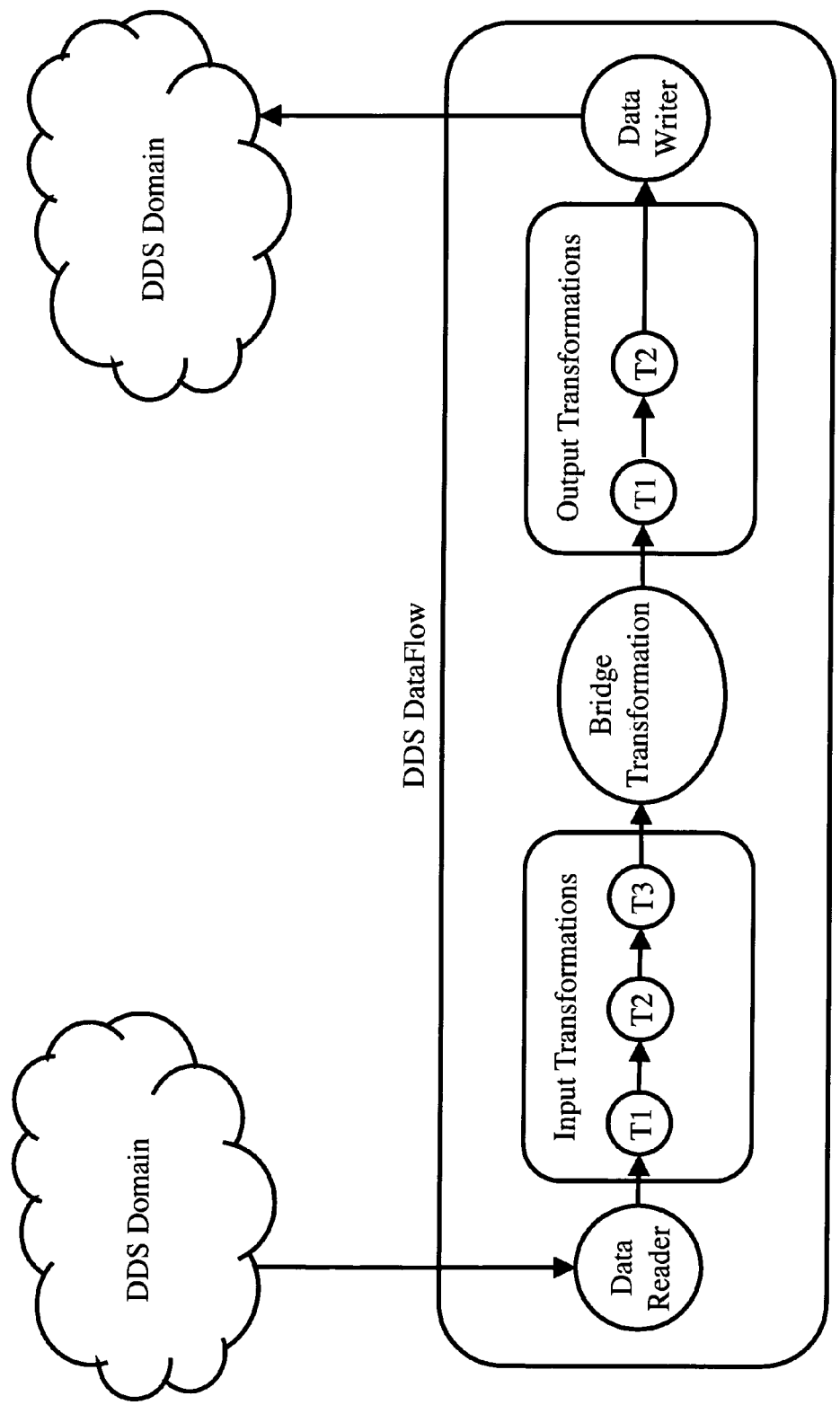
FIG. 1 shows an architecture of a data flow and bridge transformation between data distributed service (DDS) domains according to an exemplary embodiment of the invention.

The present invention concerns an automatic way to bridge DDS domains based on rules applied to DDS discovery data. Bridging is embodied in a software application or a library of software modules that uses the DDS middleware libraries to automatically create DDS Entities based on rules. A bridge in the context of this invention defines the concept of a "DDS DataFlow". DDS Entities are always created within a DDS DataFlow. A DDS DataFlow includes (FIG. 1):
- a DDS DataReader with a known Topic name,
- a set of input transformations,
- a bridge transformation,
- a set of output transformations, and
- a DDS DataWriter with a known Topic name.

The DDS DataReader and the input transformations are considered input DDS DataFlow objects. The DDS DataWriter and the output transformations are considered output DDS DataFlow objects.

In one example, the objects that constitute the DDS DataFlow can be in one of 3 states:
- awaiting creation,
- created, or
- enabled.

Rules tell the bridge when to create DDS DataFlows and how to transition the objects in a DataFlow from one state to another. There are creation rules and enabling rules.

Creation Rules

Creation rules apply to the input DDS domain or to the to the output DDS domain. An input creation rule specifies an expression based on the topic name (e.g. Stock, Track, Temperature, etc.), type name (e.g. StockType, TrackType, etc.) and QoS properties (e.g. Reliability, Deadline, Liveliness, etc.) of objects discovered in the input DDS domain. An output creation rule specifies an expression based on the topic name, type name and QoS properties of objects discovered in the output domain.

When the bridge discovers a DDS entity that matches any of the creation rules, it will create a DDS DataFlow and some of the objects within the DataFlow.

For an input creation rule the bridge will create the input objects and it will configure the topic name of the DataWriter in the output objects. The output objects will be created as soon as the type and QoS of the DataWriter is known.

For an output creation rule the bridge will create the output objects and it will configure the topic name of the DataReader in the input objects. The input objects will be created as soon as the type and QoS of the DataReader is known.

As a result of these rules a DataFlow will always bridge a DDS Topic in the input DDS domain to a DDS Topic in the output DDS domain.

According to one example, the missing type and QoS can become known in 3 ways:

1. It is preconfigured on the bridge.
2. It is discovered based on the Topic name using discovery in the input DDS domain.
3. It is discovered based on the Topic name using discovery in the output DDS domain.

The bridge can be configured to use one or more of the above mentioned ways. For example, the type and QoS resolution could be configured using only the discovery information in the input DDS domain or using the discovery information in both DDS domains.

The DDS objects are created in a disabled state. Note that creation rules ensure the created DDS objects always have a known type.

The input transformation objects are created after the DataReader object is created and they are provided the data type they should use as input. The output data type is determined in one of three ways:

1. It can be configured in the bridge configuration as a type name and a type representation (type description).
2. It can be queried by the bridge on the transformation. This query will provide the type representation that the transformation must use to describe its output data type.
3. It can be configured with a type name only and it will wait until the bridge discovers a data type in the DDS input domain that matches that type name.

Input transformations are created in sequence, beginning with the one attached to the DataReader. The output data type of a transformation is used as the input data type of the next transformation in the chain.

The output transformation objects are created after the DataWriter object is created and they are provided the data type they should use as output. The input data type is determined in one of three ways:

1. It can be configured in the bridge configuration as a type name and a type representation (type description).
2. It can be queried by the bridge on the transformation. This query will provide the type representation that the transformation must use to describe its input data type.
3. It can be configured with a type name only and it will wait until the bridge discovers a data type in the DDS output domain that matches that type name.

Output transformations are created in sequence, beginning with the one attached to the DataWriter and going backward. The input data type of a transformation is used as the output data type of the previous transformation in the chain.

Note that the rules ensure that created transformation objects always have known input and output types.

Once the input and output DataFlow objects are created the bridge transformation is created and it is provided the types of both input and output.

The creation of a transformation object may return an error if it does not support the provided data type or data types in the case of the bridge transformation.

Enabling Rules

Enabling rules apply separately to input objects, output objects and the bridge transformation.

For input objects, according to one example, there could be 5 rules:

1. Immediate—Objects are enabled as soon as they are created.
2. On domain match—Objects are enabled when the bridge discovers a matched entity on the input DDS domain. Matching is based on Topic name, Type Name, and or QoS.
3. On route match—Input objects are enabled when the output objects are enabled.

4. On domain AND route—Input objects are enabled when both the domain and route match rules apply.
5. On domain OR route—Input objects are enabled when either route match rules apply.

If the condition that caused the objects to be enabled becomes false the objects are disabled.

The output objects apply the respective rules where input is replaced with output and vice versa.

The bridge transformation is enabled when both input and output objects are enabled and disabled when either of the two sides is disabled.

The invention can also be characterized by the following statements.

Automatically bridging DDS Domains, whereby a bridge application is configured with two DDS Domains, each DDS Domain containing a set of input rules, output rules, and bridge transformation rules. These rules determine the creation of the DDS DataFlows, bridging an input DDS Topic to an output DDS Topic.

A DDS DataFlow with several kinds of objects: a DDS DataReader, a DDS DataWriter, 0 or more input transformations, 0 or more output transformations, and 0 or 1 bridge transformations.

An input rule that applies to the input DDS Domain and has a creation rule and an enabling rule.

An output rule that applies to the output DDS Domain and has a creation rule and enabling rule.

Creation Rules

An input creation rule that specifies an expression based on the topic name, type name and QoS properties of DDS entities discovered in the input DDS domain.

An output creation rule that specifies an expression based on the topic name, type name and QoS properties of DDS objects discovered in the output DDS domain.

A bridge capable of monitoring the input DDS domain and able to create the DDS DataFlow when it discovers a DDS entity that matches the input creation rule.

A bridge capable of monitoring the output DDS domain and able to create the DDS DataFlow when it discovers a DDS entity that matches the output creation rule.

A bridge capable of creating the DDS DataReader and input transformations objects in the DDS DataFlow and able to configure the topic name of the DDS DataWriter in that same DDS DataFlow.

A bridge capable of creating the DDS DataWriter and output transformations objects in the DDS DataFlow and able to configure the topic name of the DDS DataReader in that same DDS DataFlow.

A bridge capable of creating the output objects in the DDS DataFlow as soon as the type and QoS of the DDS DataWriter is known.

A bridge capable of creating the input objects in the DDS DataFlow as soon as the type and QoS of the DDS DataReader is known.

In one aspect, the type and QoS of the DataWriter could be known by means of being configured in the bridge.

In another aspect, the type and QoS of the DataWriter could be known by means of being discovered in the DDS output domain.

In still another aspect, the type and QoS of the DataWriter could be known by means of being discovered in the DDS input domain.

In still another aspect, the type and QoS of the DataReader will be known by means of being configured in the bridge.

In still another aspect, the type and QoS of the DataReader will be known by means of being discovered in the DDS input domain.

In yet another aspect, the type and QoS of the DataReader will be known by means of being discovered in the DDS output domain.

In one aspect, the input transformation objects can be created after the DataReader object in the DDS DataFlow is created. Each transformation object is created in sequence, starting with the one directly attached to the DataReader.

In another aspect, the output transformation objects are created after the DataWriter object in the DDS DataFlow is created. Each transformation object is created in sequence, starting with the one directly attached to the DataWriter.

In still another aspect, the input transformation object is provided the data type of the input. The input data type is the output data type of the previous transformation in the sequence, starting with the type of the DataReader.

In yet another aspect, the output transformation object is provided the data type of the output. The output data type is the input data type of the next transformation in the sequence, starting with the type of the DataWriter.

An input transformation object that could be queried for the data type it will produce as an output of the transformation.

An input transformation object that could be given a type representation to use when returning the data type it will produce as an output of the transformation.

An input transformation object that could be provided the data type of the output it must produce as a result of the transformation.

An output transformation object that could be queried for the data type it will accept as an input of the transformation.

An output transformation object that could be given a type representation to use when returning the data type it will accept as an input of the transformation.

An output transformation object that could be provided the data type of the input it must accept.

Enabling Rules

An input enabling rule applies to DDS DataFlows created by the corresponding input creation rule and which includes a DDS DataFlow input objects rule and a DDS DataFlow output objects rule.

An output enabling rule applies to DDS DataFlows created by the corresponding output creation rule and which includes a DDS DataFlow input objects rule and a DDS DataFlow output objects rule.

Input objects enabling rule states that DataFlow input objects in the "Created" state should be automatically enabled.

Input objects enabling rule states that DataFlow input objects in the "Created" state should be enabled when a matching DDS DataWriter is discovered on the input DDS domain.

Input objects enabling rule states that DataFlow input objects in the "Created" state should be enabled when the DataWriter in the DDS DataFlow is enabled.

Input objects enabling rule states that DataFlow input objects in the "Enabled" state should be moved to the "Created" state (disabled) when rule that caused the transition to the "Enabled" state no longer applies.

Output objects enabling rule states that DataFlow output objects in the "Created" state should be automatically enabled.

Output objects enabling rule states that DataFlow output objects in the "Created" state should be enabled when a matching DDS DataReader is discovered on the output DDS domain.

Output objects enabling rule states that DataFlow output objects in the "Created" state should be enabled when the DataReader in the DDS DataFlow is enabled.

Output objects enabling rule states that DataFlow output objects in the "Enabled" state should be moved to the "Created" state (disabled) when rule that caused the transition to the "Enabled" state no longer applies.

Bridge Transformation

A bridge transformation rule stating that the bridge transformation object in a DDS DataFlow is enabled when all input and output objects in the DDS DataFlow are enabled.

A bridge transformation rule stating that the bridge transformation object in a DDS DataFlow is disabled when any input or output objects in the DDS DataFlow transitions out of the "Enabled" state.

Embodiments of the invention can be deployed in various ways. For example, the DDS domain bridge can be a software application executable on a computer platform. It can be a standalone application running as a service after the user completes the installation process. It can also be deployed as a software library linked into third party software applications. Once the third party establishes a link with the software library, they become DDS domain bridges.

Figure 2:
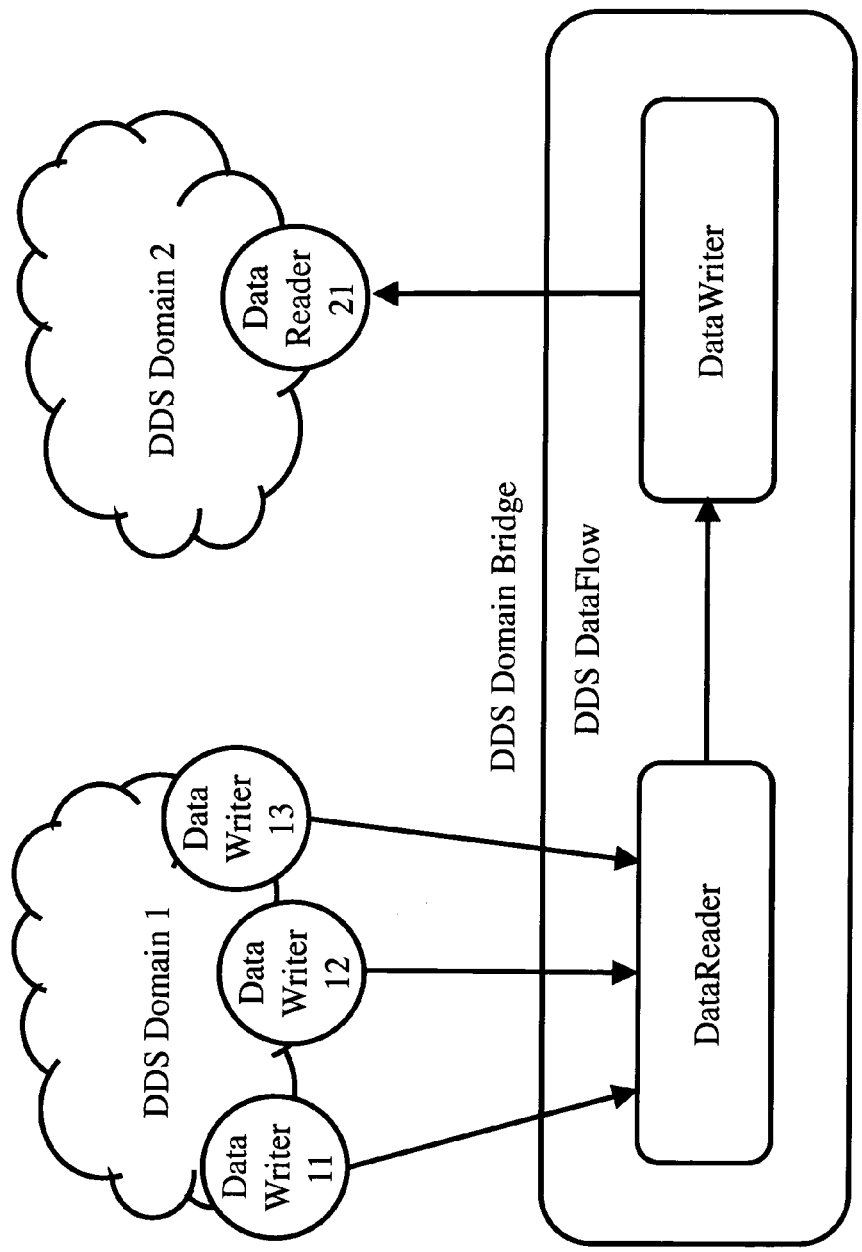
FIG. 2 shows, according to an exemplary embodiment of the invention regarding scalability, an architecture of the use of a single data distributed service (DDS) DataWriter in a DDS DataFlow to proxy for a collection of a plurality of DDS DataWriters on the other side of the DDS bridge.
Figure 3:
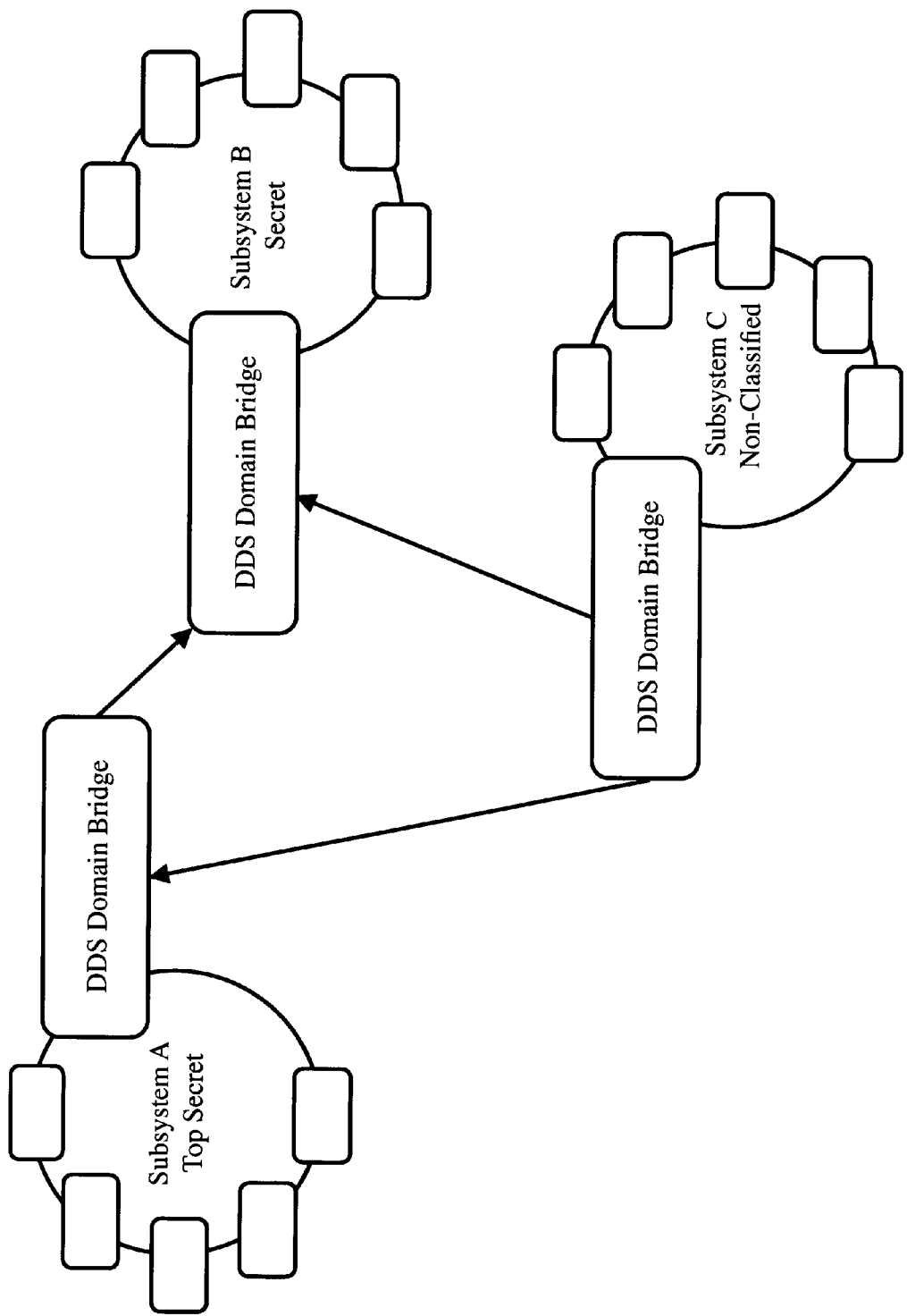
FIG. 3 shows, according to an exemplary embodiment of the invention regarding multi-level security gateways, an architecture of how a DDS DataFlow can be configured to be uni-directional. The DDS domain bridge can be used to implement one-way DataFlows that only let lower classified data in. Such a bridge can be used to prevent higher classified data from leaving a high-class network, enable all non-classified data to be seen on all networks, and prevents a non-classified network from seeing any classified data.
Figure 4:
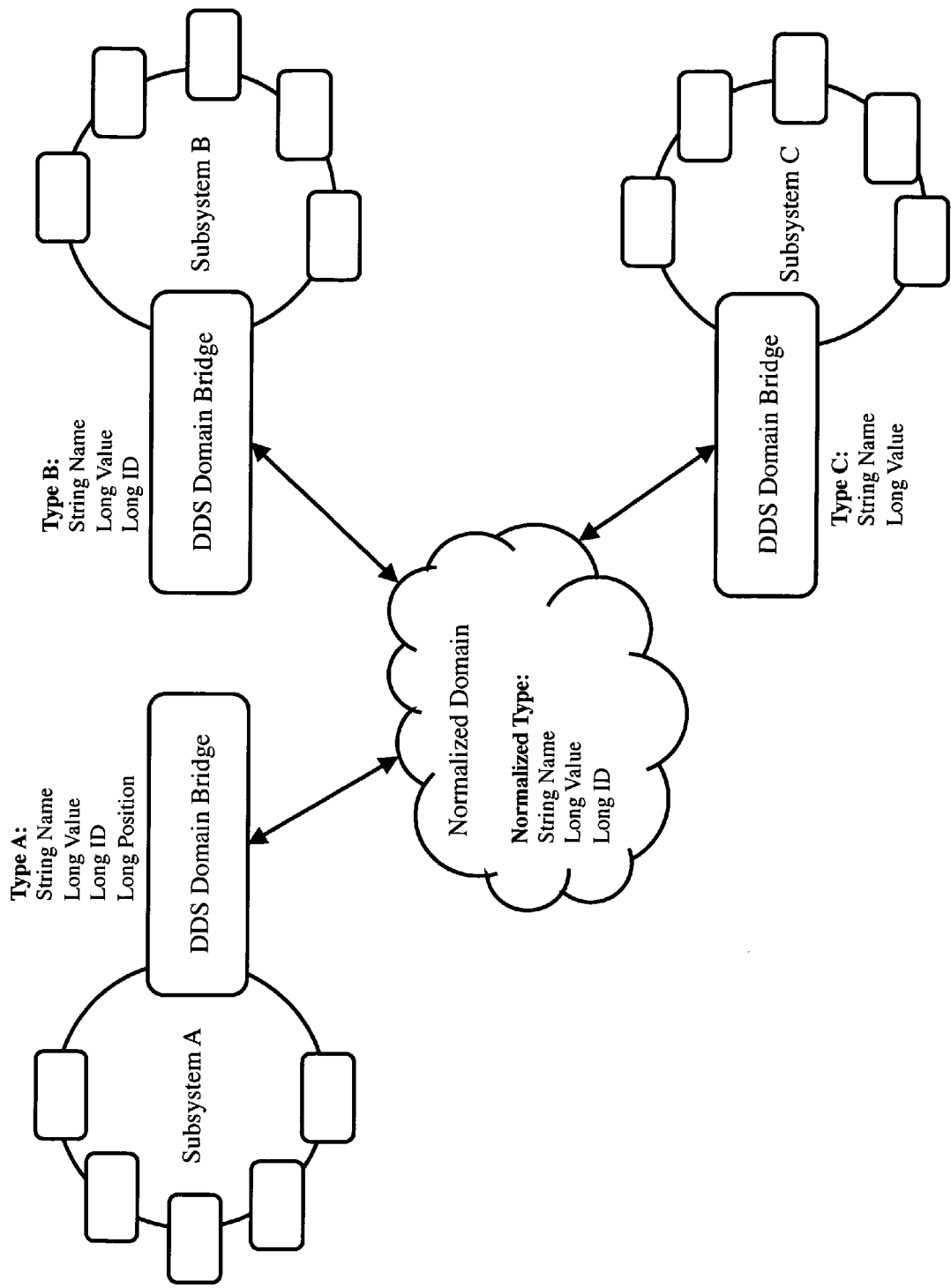
FIG. 4 shows, according to an exemplary embodiment of the invention regarding Data Fusion/Normalization, an architecture of how DDS DataFlows can transform or normalize any data type to any data type. The DDS Domain Bridge can remove extraneous data from subsystem types to normalized types. The DDS Domain Bridge can also add constants for data values where no field is available from a subsystem type.

Additionally, with respect to the proxy behavior, the DDS DataWriter in a DDS DataFlow serves as a proxy for multiple DataWriters on the other side of the bridge. Likewise, the DDS DataReader in a DDS DataFlow serves as a proxy for multiple DataReaders on the other side of the bridge. The proxy behavior of the DDS DataFlow entities facilitates more scalable architectures since discovery traffic is isolated across the DDS domains on each side of the bridge. FIG. 2 shows the proxy behavior of a DDS DataFlow.

Figure 5:
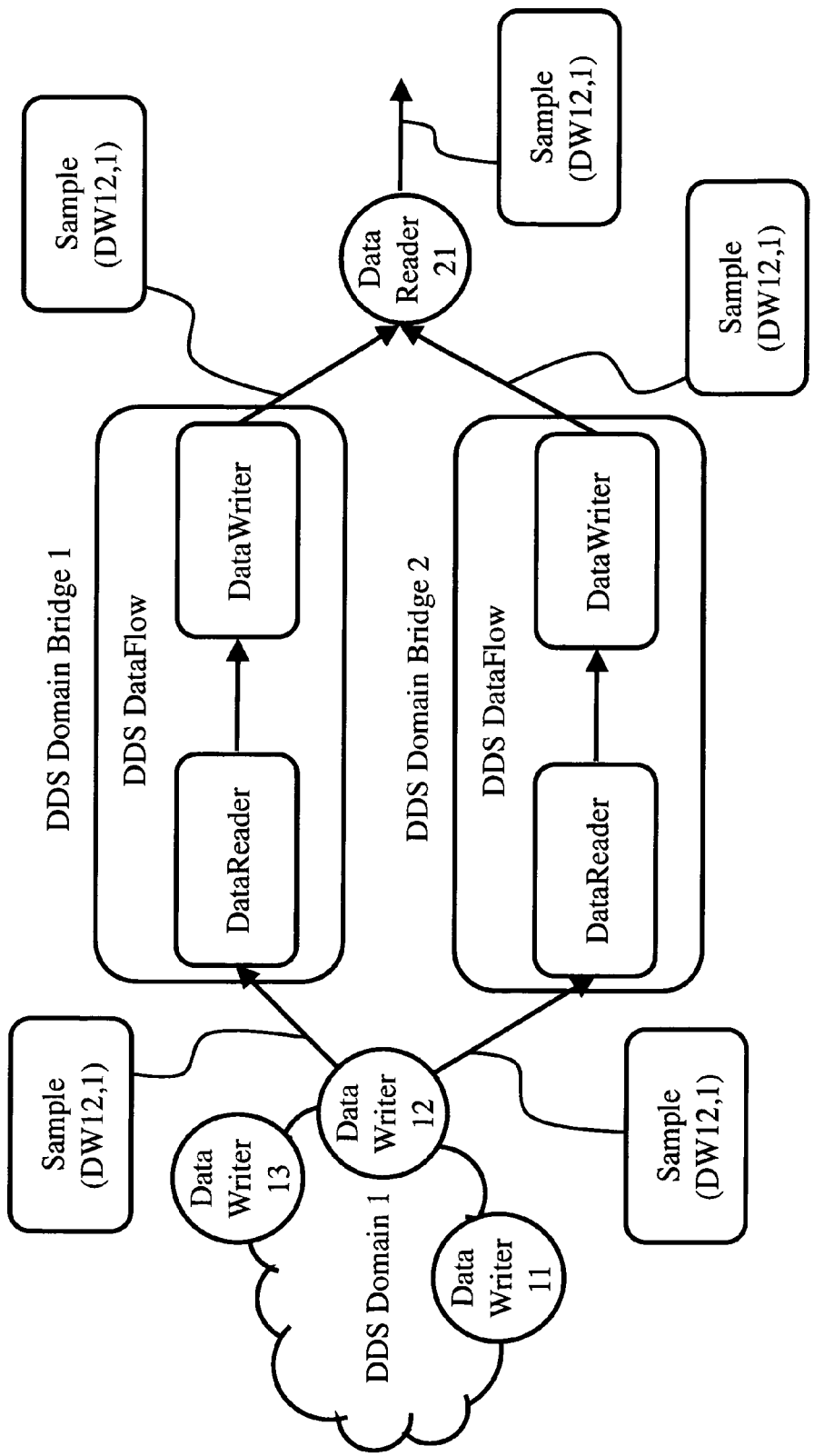
FIG. 5 shows, according to an exemplary embodiment of the invention regarding redundancy in the deployment of the system (compare to FIG. 2), where the DDS DataFlows propagate the original identity of the samples published by the DataWriters. This property enables redundant bridge configurations. The DataWriter publishes sample (DW12,1) where DW12 is the DataWriter GUID (128-bit identifier) and 1 is the sample sequence number (64-bit integer). The DDS DataFlows preserve the original identity of the sample when it is published by the DDS DataFlows DataWriters. The DataReader receives two copies of the sample, but only provides one copy of the sample to the application, i.e. discarding duplicates.

With respect to the end-to-end property propagation, despite its proxy behavior, a DDS DataFlow supports the propagation of some of the QoS characteristics and properties of the entities and samples (e.g. data of a topic) proxied at the other side of the bridge. For example, the propagation of the original identity of a sample enables redundancy scenarios (FIG. 5).

The properties and QoS characteristics are propagated as meta data (inline QoSs) associated with the samples published by the DDS DataFlows DataWriters. Examples of such properties are:

Sample identity. The sample identity is composed of a 128-bit DataWriter GUID identifying the DataWriter and a 64-bit sequence number identifying the sample for the DataWriter Source timestamp. This is the source timestamp that was associated to the sample when it was published by the original DataWriter Sample priority. The sample priority.

QoS properties (Deadline, Latency Budget, Ownership strength, Lifespan, etc.).

What is claimed is:

1. A method for bridging data distributed service (DDS) domains, comprising:

(a) in a networked system having a first DDS domain representing a first communication data space in which only publishers and subscribers of said first DDS domain interact and a second DDS domain, representing a second communication data space in which only publishers and subscribers of said second DDS domain interact, wherein each of said DDS domain comprise a plurality of DDS software applications each running on a computer platform in an independent and distributed manner across said networked system, and wherein each of said DDS software applications publishes data and subscribes to data; and (b) having a DDS domain bridge executable as a software application or a software library on a computer system, said DDS domain bridge is a direct communication coupling bridge for DDS data between said first communication data space formed said second DDS domain, said DDS domain bridge communicatively coupled with said DDS software applications of both said DDS domains and monitoring discovery data by said DDS software applications for atopic name, a topic type, QoS properties or any combination thereof, wherein said DDS domain bridge comprises a plurality of bridge domain rules based on said topic name, said topic type, said QoS properties or any combination thereof organized as creation rules and enabling rules, wherein said creation rules control the creation of input DDS dataflow objects and output DDS dataflow objects for said DDS data, wherein said enabling rules control the enabling state of said input and output DDS dataflow objects for said DDS data, and when said input and output DDS dataflow objects are both in said enabling state set by said enabling rules a DDS dataflow is established between said input DDS dataflow objects and said output DDS dataflow object, wherein said DDS dataflow enables data propagation from one or more of said DDS software applications in said first DDS domain through said enabled input DDS dataflow objects subscribing to said published data to one or more of said DDS software applications in said second DDS domain through said enabled output DDS dataflow objects publishing said received data.

2. The method as set forth in claim 1, wherein said DDS domain bridge is configured to be uni-directional or bi-directional.

3. The method as set forth in claim 1, wherein said DDS domain bridge is configured to prevent showing, publishing or writing classified data.

4. The method as set forth in claim 1, further comprising normalizing, transforming or removing some or all of said data.

5. The method as set forth in claim 1, wherein said data propagation comprises propagation of data properties, data values or a combination thereof.

6. The method as set forth in claim 5, wherein said data properties are a source timestamp, an identity, a deadline, a latency budget, an ownership strength, a lifespan, or a combination thereof.

7. The method as set forth in claim 1, further comprising creating a redundant DDS Domain bridge configuration including a first DDS domain bridge as being said DDS domain bridge and a second DDS domain bridge configured similarly as said first DDS domain bridge.

* * * * *